(12) United States Patent
Wyatt

(10) Patent No.: US 10,550,799 B2
(45) Date of Patent: Feb. 4, 2020

(54) THROTTLED PURGE SYSTEM

(71) Applicant: Colton Wyatt, Lake Orion, MI (US)

(72) Inventor: Colton Wyatt, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/621,139

(22) Filed: Jun. 13, 2017

(65) Prior Publication Data

US 2018/0355826 A1 Dec. 13, 2018

(51) Int. Cl.
*F02M 35/10* (2006.01)
*F02M 25/08* (2006.01)
*F02M 35/024* (2006.01)
*F02B 37/00* (2006.01)
*F02D 41/00* (2006.01)

(52) U.S. Cl.
CPC .......... *F02M 25/089* (2013.01); *F02B 37/00* (2013.01); *F02D 41/003* (2013.01); *F02M 25/0836* (2013.01); *F02M 25/0854* (2013.01); *F02M 35/02416* (2013.01); *F02M 35/10222* (2013.01); *F02D 2250/41* (2013.01)

(58) Field of Classification Search
CPC .......... F02M 25/0836; F02M 25/0872; F02M 25/089; F02M 2025/0845; F02M 35/10229
See application file for complete search history.

(56) References Cited

U.S. PATENT DOCUMENTS

| | | | |
|---|---|---|---|
| 5,699,775 A * | 12/1997 | Azuma | F02M 25/0809 123/520 |
| 6,138,644 A * | 10/2000 | Saruwatari | F02D 41/004 123/519 |
| 6,257,209 B1 * | 7/2001 | Hyodo | F02D 11/105 123/516 |
| 6,736,116 B2 * | 5/2004 | Kawano | F02M 25/0809 123/520 |
| 6,863,057 B2 * | 3/2005 | Kawano | F02M 25/0809 123/494 |

(Continued)

FOREIGN PATENT DOCUMENTS

| | | |
|---|---|---|
| DE | 10246108 A1 | 4/2004 |
| DE | 102007040913 A1 | 3/2009 |
| DE | 102011018863 A1 * | 7/2012 ........... F02M 25/089 |

OTHER PUBLICATIONS

International Search Report and Written Opinion dated Oct. 1, 2018 for International Application No. PCT/US2018/036842, InternationL Filing Date Jun. 11, 2018.

*Primary Examiner* — Kevin R Steckbauer
(74) *Attorney, Agent, or Firm* — Ralph E. Smith

(57) ABSTRACT

An evaporative emissions control system for an internal combustion engine having an air intake manifold is provided. The system includes a carbon canister configured to receive fuel vapor, a purge valve fluidly coupled to the carbon canister, an air induction system configured to fluidly couple to the air intake manifold, a conduit fluidly coupled between the purge valve and the air induction system, and an inlet valve disposed in the air induction system. The inlet valve is configured to selectively move between an open position and a closed position to vary an air restriction in the air induction system and generate a vacuum. The vacuum draws fuel vapor from the carbon canister through the conduit into the air induction system.

16 Claims, 3 Drawing Sheets

(56) References Cited

U.S. PATENT DOCUMENTS

| | | | | |
|---|---|---|---|---|
| 7,284,541 B1* | 10/2007 | Uchida | F02M 25/089 | 123/520 |
| 8,807,122 B2* | 8/2014 | Mai | F02M 25/0836 | 123/196 S |
| 9,303,601 B2* | 4/2016 | Aso | F02M 37/106 | |
| 9,322,366 B2* | 4/2016 | Pursifull | F02M 25/0809 | |
| 9,353,709 B2* | 5/2016 | Aso | F02M 25/0854 | |
| 9,689,325 B2* | 6/2017 | Nanba | F02D 41/004 | |
| 10,087,857 B2* | 10/2018 | Dudar | F02D 41/004 | |
| 2003/0019481 A1* | 1/2003 | Kawano | F02M 25/0809 | 123/520 |
| 2003/0029226 A1* | 2/2003 | Kawano | F02M 25/0809 | 73/40.5 R |
| 2007/0227515 A1* | 10/2007 | Uchida | F02M 25/089 | 123/520 |
| 2012/0031380 A1* | 2/2012 | Mai | F02M 25/0809 | 123/520 |
| 2012/0247432 A1* | 10/2012 | Cardno | F02M 25/0872 | 123/518 |
| 2013/0220282 A1 | 8/2013 | Hadre et al. | | |
| 2013/0276756 A1* | 10/2013 | Leone | F02D 41/064 | 123/445 |
| 2013/0282230 A1 | 10/2013 | Sager et al. | | |
| 2014/0060160 A1* | 3/2014 | Pursifull | F02M 25/0809 | 73/40 |
| 2014/0165972 A1* | 6/2014 | Aso | F02M 25/0854 | 123/520 |
| 2014/0251284 A1 | 9/2014 | Plymale et al. | | |
| 2014/0318514 A1 | 10/2014 | Pursifull | | |
| 2015/0096541 A1 | 4/2015 | Edmund et al. | | |
| 2015/0285170 A1* | 10/2015 | Nanba | F02D 41/004 | 123/520 |
| 2018/0080416 A1* | 3/2018 | Choi | F02D 41/004 | |
| 2018/0080417 A1* | 3/2018 | Dudar | F02M 25/0836 | |
| 2018/0135565 A1* | 5/2018 | Choi | F02D 41/0032 | |
| 2018/0209359 A1* | 7/2018 | Dudar | F02D 41/004 | |
| 2018/0274493 A1* | 9/2018 | Tawa | F02M 25/0836 | |

* cited by examiner

THROTTLED PURGE SYSTEM

FIELD

The present application relates generally to evaporative fuel emissions systems for an engine and, more particularly, to evaporative fuel emissions systems having a throttled purge system.

BACKGROUND

Modern internal combustion engines generate hydrocarbon emissions by evaporation of combustible fuels such as gasoline. As a result, vehicle fuel vapor emissions to the atmosphere are regulated. For the purpose of preventing fuel vapor from escaping to the atmosphere, an evaporative emissions control (EVAP) system is typically implemented to store and subsequently dispose of fuel vapor emissions.

The EVAP system is typically designed to collect vapors produced inside an engine's fuel system and then send the vapors through the engine intake manifold into its combustion chamber to be burned as part of the aggregate fuel-air charge. When pressure builds inside the fuel tank as a result of evaporation, fuel vapors are transferred to and stored in a carbon canister. Subsequently, when engine operating conditions are conducive, a valve is opened and vacuum from the intake manifold draws a purge flow of the stored hydrocarbons from the canister to the engine's combustion chamber. Thereafter, the carbon canister is regenerated with newly formed fuel vapor, and the cycle can continue.

In naturally aspirated engines, the intake manifold provides the vacuum required for the purge flow. In conventional forced induction engines, the intake manifold can be used for purge flow when under vacuum, but in boosted modes the purge flow must be achieved through a secondary vacuum source. This is typically accomplished using a purge ejector tee or jet pump having a venturi to create a vacuum and pull the fuel vapor from the canister using boost pressure. However, such systems require additional parts that increase cost and may become disconnected, thereby requiring complex leak detection systems. Accordingly, while such systems work well for their intended purpose, there remains a need for an improved EVAP system.

SUMMARY

According to one example aspect of the invention, an evaporative emissions control system for an internal combustion engine having an air intake manifold is provided. The system includes a carbon canister configured to receive fuel vapor, a purge valve fluidly coupled to the carbon canister, an air induction system configured to fluidly couple to the air intake manifold, a conduit fluidly coupled between the purge valve and the air induction system, and an inlet valve disposed in the air induction system. The inlet valve is configured to selectively move between an open position and a closed position to vary an air restriction in the air induction system and generate a vacuum. The vacuum draws fuel vapor from the carbon canister through the conduit into the air induction system.

In addition to the foregoing, the described system may include one or more of the following features: wherein the inlet valve is disposed upstream of a fluid connection between the conduit and the air induction system; wherein the system does not include a purge ejector tee; wherein the system does not include a second conduit fluidly coupled between the air induction system and the engine intake manifold; wherein the inlet valve is an electronically controlled throttle valve; a biasing mechanism configured to bias the inlet valve to the open position; wherein the inlet valve is an electronically controlled solenoid valve; a second conduit fluidly coupled between the purge valve and the intake manifold; and wherein the system does not include a second conduit fluidly coupled between the purge valve and the intake manifold.

According to another example aspect of the invention, a vehicle is provided. The vehicle includes an internal combustion engine having an intake manifold, an air induction system fluidly coupled to the intake manifold, and an evaporative emissions control system. The evaporative emissions control system includes a carbon canister configured to receive fuel vapor, a purge valve fluidly coupled to the carbon canister, a conduit fluidly coupled between the purge valve and the air induction system, and an inlet valve disposed in the air induction system. The inlet valve is configured to selectively move between an open position and a closed position to vary an air restriction in the air induction system and generate a vacuum. The vacuum draws fuel vapor from the carbon canister through the conduit into the air induction system.

In addition to the foregoing, the described system may include one or more of the following features: wherein the inlet valve is disposed upstream of a fluid connection between the conduit and the air induction system; wherein the system does not include a purge ejector tee; wherein the system does not include a second conduit fluidly coupled between the air induction system and the engine intake manifold to supply air from the intake manifold to the air induction system; wherein the inlet valve is an electronically controlled throttle valve; a biasing mechanism configured to bias the inlet valve to the open position; wherein the inlet valve is an electronically controlled solenoid valve; a second conduit fluidly coupled between the purge valve and the intake manifold; wherein the system does not include a second conduit fluidly coupled between the purge valve and the intake manifold; and a turbocharger disposed between the air induction system and the intake manifold, wherein the air induction system includes a dirty side duct, an air cleaner, and a clean side duct, the inlet valve disposed upstream of the clean side duct and downstream of the dirty side duct and the air cleaner.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. a schematic diagram of an EVAP system of a typical internal combustion engine with forced induction.

DETAILED DESCRIPTION

The present application is directed to evaporative emissions control (EVAP) systems for an engine, such as an internal combustion engine, with forced induction. The described EVAP systems do not require a purge ejector tee that is commonly utilized in conventional EVAP systems. Rather, in one example, an inlet valve is incorporated into the air induction system to vary or throttle a restriction in the air induction system to create a vacuum to establish purge flow from the canister. Such an arrangement eliminates fluid flow lines and connections from the conventional EVAP system, which can reduce complexity and improve robustness of the EVAP system, including improved leak detection capability.

Figure 1:
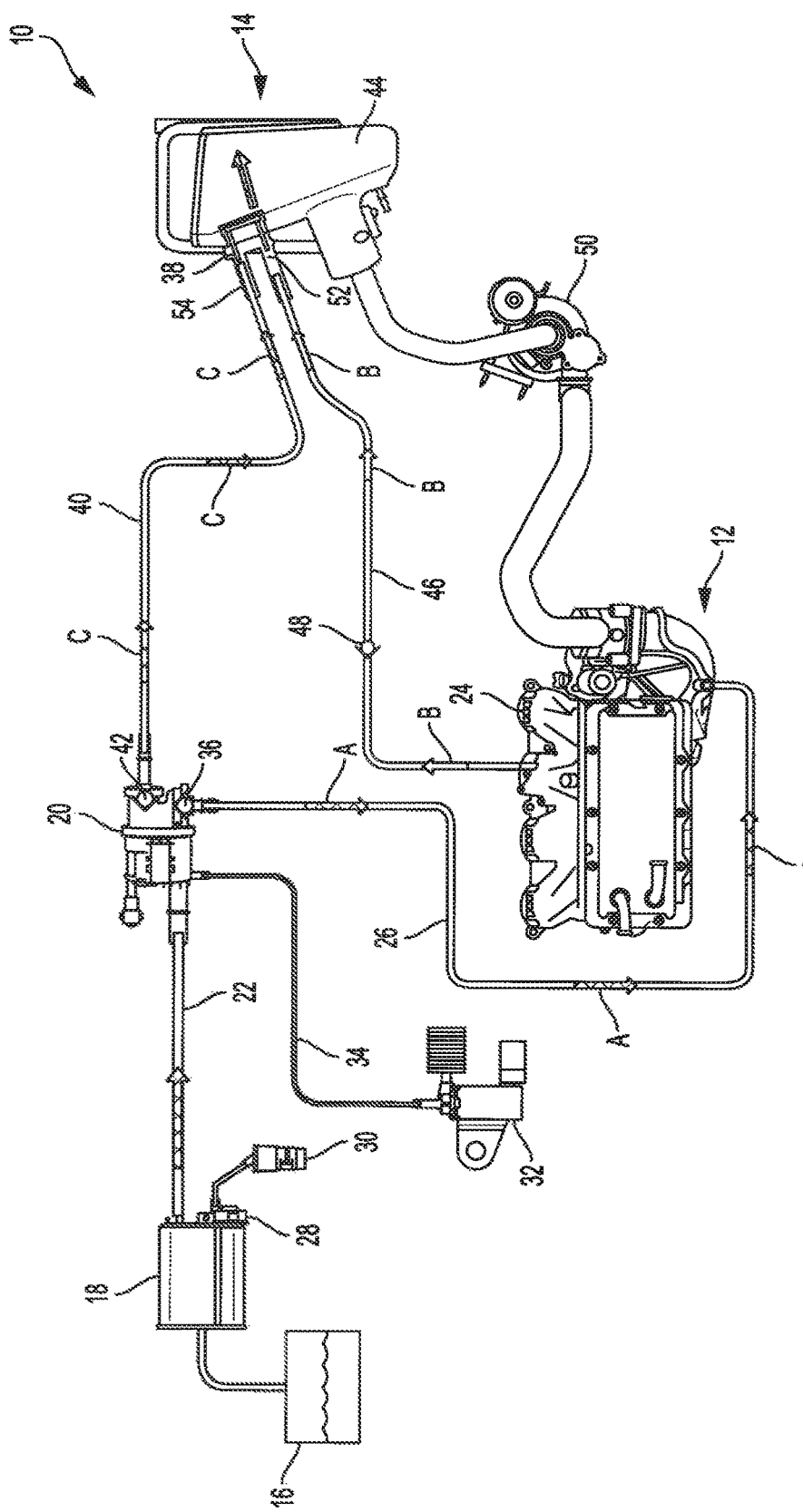

Referring now to the drawings, FIG. 1 illustrates an EVAP system 10 of a typical internal combustion engine 12 with a forced air induction system 14. EVAP system 10 can include a fuel tank 16 in fluid communication with a purge or carbon canister 18 for capturing fuel vapor from the fuel tank 16. Carbon canister 18 is in fluid communication with a purge valve 20 via a conduit 22. Purge valve 20 is configured to selectively release the fuel vapor from carbon canister 18 to an engine intake manifold 24 via a conduit 26 in response to engine manifold vacuum.

In the example embodiment, carbon canister 18 is in fluid communication with an evaporative system integrity monitor (ESIM) switch 28, which is configured to stay on if the EVAP system 10 is operatively sealed in the presence of engine vacuum, and to toggle off if the EVAP system 10 experiences a leak (loss of vacuum). ESIM switch 28 can be in fluid communication with the atmosphere via a filter 30. Moreover, EVAP system 10 may include an on-board diagnostics vacuum bypass valve 32 in fluid communication with purge valve 20 via a conduit 34. Vacuum bypass valve 32 is a normally closed valve configured to provide open venting to the atmosphere when energized upon command. Such venting may be utilized to meet ESIM switch rational and purge monitor diagnostics and on-board diagnostics (OBD) including leak detection requirements.

A check valve 36 is disposed in conduit 26 or purge valve 20 and is configured to allow purge flow to intake manifold 24 when system pressure is less than atmospheric pressure (e.g., vacuum). Check valve 36 is configured to prevent a reversal of flow to purge valve 20 when the system pressure is greater than atmospheric pressure (e.g., boost).

Purge valve 20 is also in fluid communication with a purge ejector tee 38 via a conduit 40. A check valve 42 is disposed in conduit 40 or purge valve 20 and is configured to allow flow to the ejector tee 38 when the system pressure is greater than atmospheric pressure (e.g., boost). Check valve 42 is configured to prevent flow from purge valve 20 when the system pressure is less than atmospheric pressure (e.g., vacuum).

Ejector tee 38 is coupled to an air box 44 of the air induction system 14. Ejector tee 38 includes a nozzle or orifice (not shown) that creates a drop in pressure to form an accelerated airflow. Ejector tee 38 is also in fluid communication with the intake manifold via a conduit 46. A check valve 48 is disposed in conduit 46 and is configured to allow flow to the ejector tee 38 when system pressure is greater than atmospheric pressure. Check valve 48 is configured to prevent flow from intake manifold 24 when the system pressure is less than atmospheric pressure.

In a naturally aspirated mode, the purge valve 20 can be controlled to allow flow therethrough, and fuel vapor drawn from carbon canister 18 is directed to intake manifold 24 in a flow path depicted by arrows A. The fuel vapor is drawn from carbon canister 18 by intake manifold vacuum and the drawn fuel vapor is supplied via the intake manifold 24 to combustion chambers (not shown) of the engine 12 to be burned with the main fuel-air charge.

In a boost mode, facilitated by a turbocharger 50, high pressure boost air flow from turbocharger 50 flows through air conduit 46 in the direction of arrows B and into a first inlet port 52 of purge ejector tee 38. From the first inlet port 52, the high pressure boost air flows through the venturi nozzle (not shown), which creates a low pressure or vacuum thereby drawing purge flow through a second inlet port 54 and into the air induction system 14. In particular, the vacuum created from the boost air flow through the venturi draws purge fuel vapor along the flow path of arrows C through purge valve 20, through conduit 40, and directly into second inlet port 54. From the second inlet port 54, the purge fuel vapor flows downstream of the venturi where it mixes with the boost air flows into first inlet port 52 to be burned with the main fuel-air charge.

Figure 2:
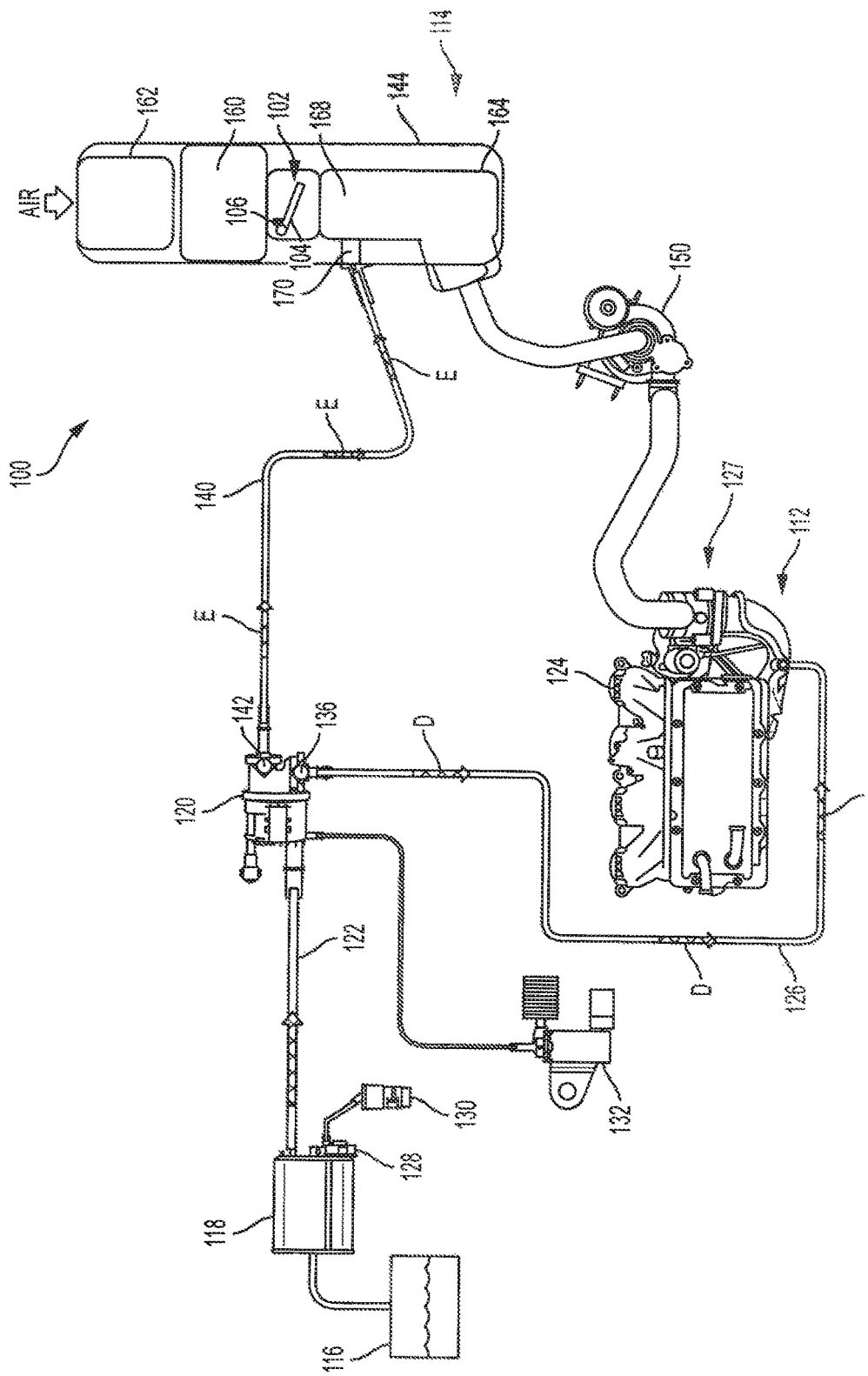
FIG. 2 is a schematic diagram of an example EVAP system for an internal combustion engine with forced induction, in accordance with the principles of the present disclosure.

Turning now to FIG. 2, an example EVAP system is illustrated and generally identified at reference numeral 100 in accordance with the principles of the present disclosure. EVAP system 100 includes an inlet valve 102 configured to provide a predetermined amount of vacuum, thereby obviating the need for a purge ejector tee and associated components, and reducing cost and complexity by eliminating components from EVAP system 10. As discussed in greater detail below, in one example implementation, the inlet valve 102 can be integrated into the air induction system thereby eliminating the purge ejector tee 38, fluid conduit 46, and check valve 48 of EVAP system 10. Thus, EVAP system 100 provides a more robust system with fewer components and potential leak paths while reducing cost.

FIG. 2 illustrates EVAP system 100 for an internal combustion engine 112 with a forced air induction system 114. EVAP system 100 can include a fuel tank 116 in fluid communication with a carbon canister 118 for capturing fuel vapor from the fuel tank 116. Carbon canister 118 is in fluid communication with a purge valve 120 via a conduit 122. Purge valve 120 is configured to selectively release the fuel vapor from carbon canister 118 to an engine intake manifold 124 via a conduit 126 in response to engine manifold vacuum. A throttle body valve 127 is fluidly coupled to the intake manifold 124 and is configured to selectively restrict the amount of air introduced to the engine 112.

In the example embodiment, carbon canister 118 is in fluid communication with an evaporative system integrity monitor (ESIM) switch 128, which is configured to stay on if the EVAP system 100 is operatively sealed in the presence of engine vacuum, and to toggle off if the EVAP system 100 experiences a leak (loss of vacuum). ESIM switch 128 can be in fluid communication with the atmosphere via a filter 130. Moreover, EVAP system 100 may include an on-board diagnostics vacuum bypass valve 132 in fluid communication with purge valve 120 via a conduit 134. Vacuum bypass valve 132 is a normally closed valve configured to provide open venting to the atmosphere when energized upon command. Such venting may be utilized to meet ESIM switch rational and purge monitor diagnostics.

A check valve 136 is disposed in conduit 126 or purge valve 120 and is configured to allow purge flow to intake manifold 124 when system pressure is less than atmospheric pressure (e.g., vacuum). Check valve 136 is configured to prevent a reversal of flow to purge valve 120 when the system pressure is greater than atmospheric pressure (e.g., boost).

Purge valve 120 is also in fluid communication with inlet valve 102 via a conduit 140, A check valve 142 is disposed in conduit 140 or purge valve 120 and is configured to allow flow to the inlet valve 102 when the system pressure is greater than atmospheric pressure (e.g., boost). Check valve 142 is configured to prevent flow from purge valve 120 when the intake manifold 124 supports higher purge flow.

Inlet valve 102 is disposed in the forced air induction system 114 upstream of a turbocharger 150. In one example shown in FIG. 2, inlet valve 102 is disposed in an air box 144 downstream of an air cleaner 160 and a dirty side duct 162, and upstream of a clean side duct 164. However, inlet valve 102 may be disposed in various locations throughout the air induction system 114. In the example embodiment, inlet valve 102 is an electronically controlled throttle valve that creates a drop in pressure to form an accelerated airflow through clean side duct 164 and draws purge fuel vapor through conduit 140.

In the example embodiment, inlet valve 102 includes a throttle body or restrictor plate 104 configured to move to various positions between and including fully open and fully closed positions. A biasing mechanism 106 (e.g., a spring) is configured to bias inlet valve 102 open to protect the engine in the event of a hardware malfunction. As such, inlet valve 102 is electronically controlled to various positions to create a predetermined amount of vacuum by closing restrictor plate 104. However, it will be appreciated that inlet valve 102 is not limited to a throttle valve, and inlet valve 102 may be any suitable valve that enables system 100 to function as described herein. For example, inlet valve 102 may be a solenoid valve.

In a naturally aspirated mode, the purge valve 120 can be controlled to allow flow therethrough, and fuel vapor drawn from carbon canister 118 is directed to intake manifold 124 in a flow path depicted by arrows D. The fuel vapor is drawn from carbon canister 118 by intake manifold vacuum and the drawn fuel vapor is supplied via the intake manifold 124 to combustion chambers (not shown) of the engine 112 to be burned with the main fuel-air charge.

In a boost mode, facilitated by turbocharger 150, inlet valve 102 is moved to a position to create an additional pressure drop or vacuum downstream of inlet valve 102, for example, in an area 168 proximate a fluid connection 170 between conduit 140 and clean side duct 164. The inlet valve 102 can be electronically controlled to maintain a predetermined vacuum during a wide range of operating conditions. As such, the vacuum draws purge fuel vapor from carbon canister 118, through purge valve 120 and conduit 140 in the direction of arrows E, and into air induction system 114 via fluid connection 170, which is located downstream of inlet valve 102. Accordingly, EVAP system 100 is able to create a vacuum that is able to generate a purge flow to the air induction system 114 that is greater than the purge flow of EVAP system 10. As such, EVAP system 100 provides a more robust, less expensive system that offers improved engine and evaporative emissions performance.

Figure 3:
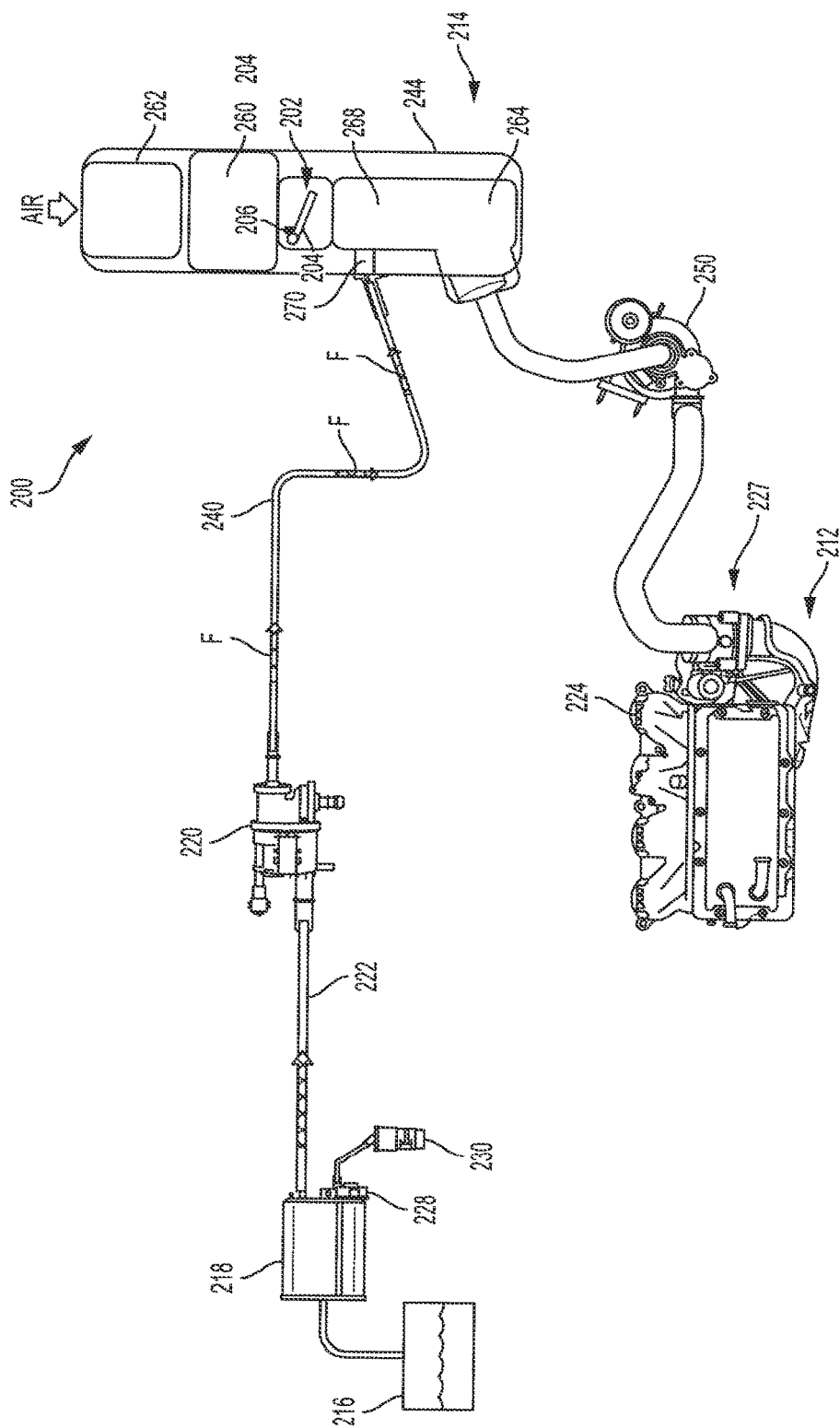
FIG. 3 is a schematic diagram of another example EVAP system for an internal combustion engine with forced induction, in accordance with the principles of the present disclosure.

Turning now to FIG. 3, an example EVAP system is illustrated and generally identified at reference numeral 200 in accordance with the principles of the present disclosure. EVAP system 200 includes an inlet valve 202 configured to provide a predetermined amount of vacuum, thereby obviating the need for a purge ejector tee and associated components, thereby reducing cost and complexity by eliminating components from EVAP system 10. As discussed in greater detail below, in one example implementation, the inlet valve 202 can be integrated with the air box thereby eliminating the purge ejector tee 38, fluid conduits 26, 34, 46, check valves 36, 42, 48, and OBD vacuum bypass valve 32 of EVAP system 10. Thus, EVAP system 200 provides a more robust system with fewer components and potential leak paths while reducing cost.

FIG. 3 illustrates EVAP system 200 for an internal combustion engine 212 with an air induction system 214. EVAP system 200 can include a fuel tank 216 in fluid communication with a carbon canister 218 for capturing fuel vapor from the fuel tank 216. Carbon canister 218 is in fluid communication with a purge valve 220 via a conduit 222. Purge valve 220 is configured to selectively release the fuel vapor from carbon canister 218 to an engine intake manifold 224 via a conduit 240 in response to opening/closing inlet valve 202, as described herein in more detail. A throttle body valve 227 is fluidly coupled to the intake manifold 224 and is configured to selectively restrict the amount of air introduced to the engine 212.

In the example embodiment, carbon canister 218 is in fluid communication with an evaporative system integrity monitor (ESIM) switch 228, which is configured to stay on if the EVAP system 200 is operatively sealed in the presence of engine vacuum, and to toggle off if the EVAP system 200 experiences a leak (loss of vacuum). ESIM switch 228 can be in fluid communication with the atmosphere via a filter 230.

Purge valve 220 is in fluid communication with inlet valve 202 via conduit 240. Inlet valve 202 is disposed in the forced air induction system 214. In one example shown in FIG. 3, inlet valve 202 is disposed in an air box 244 downstream of an air cleaner 260 and a dirty side duct 262, and upstream of a clean side duct 264. In the example embodiment, inlet valve 202 is an electronically controlled throttle valve that creates a drop in pressure to form an accelerated airflow and draws purge fuel vapor through conduit 240.

In the example embodiment, inlet valve 202 includes a throttle body or restrictor plate 204 configured to move to various positions between and including fully open and fully closed positions. A biasing mechanism 206 (e.g., a spring) is configured to bias inlet valve 202 open to protect the engine in the event of a hardware malfunction. Inlet valve 202 is electronically controlled to various positions between fully open and closed to create a predetermined amount of vacuum by closing restrictor plate 204. However, it will be appreciated that inlet valve 202 is not limited to a throttle valve, and inlet valve 202 may be any suitable valve that enables system 200 to function as described herein. For example, inlet valve 202 may be a solenoid valve.

In both a naturally aspirated mode and boost mode, the restrictor plate 204 is positioned to create additional vacuum downstream of inlet valve 202 to facilitate purge flow via fluid connection 270. For example, a low pressure area 268 is created proximate a fluid connection 270 between conduit 240 and clean side duct 264. The inlet valve 202 can be electronically controlled to maintain a predetermined vacuum during a wide range of operating conditions. As such, the vacuum draws purge fuel vapor from carbon canister 218, through purge valve 220 and conduit 240 in the direction of arrows F, and into air induction system 214 via fluid connection 270. Accordingly, EVAP system 200 creates a vacuum that generates increased purge compared to EVAP system 10. As such, EVAP system 200 provides a more robust, less expensive system that offers improved engine and evaporative emissions performance.

Described herein are systems and methods for generating a purge flow from a carbon canister in an EVAP system. The systems include replacing a conventional purge ejector tee with an inlet valve in the air induction system. The inlet valve is controlled to restrict airflow in the air induction system and generate additional vacuum therein to draw purge flow from the carbon canister. Accordingly, components of conventional EVAP systems can be eliminated, thereby providing a robust system of lowered cost and complexity while providing improved engine and evaporative emissions performance.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. An evaporative emissions control system for an internal combustion engine having an air intake manifold located downstream of a turbocharger, the system comprising:
   a carbon canister configured to receive fuel vapor;
   a purge valve fluidly coupled to the carbon canister;
   an air induction system configured to be located upstream of the turbocharger and fluidly couple to the air intake manifold;
   a conduit fluidly coupled between the purge valve and the air induction system upstream of the turbocharger; and
   an inlet valve disposed in the air induction system at a location upstream of the turbocharger, the inlet valve configured to selectively move between an open position and a closed position to vary an air restriction in the air induction system and generate a vacuum, wherein the vacuum draws fuel vapor from the carbon canister through the conduit into the air induction system;
   wherein the system does not include a second conduit which is capable of fluidly coupling the purge valve to the intake manifold.

2. The system of claim 1, wherein the inlet valve is disposed upstream of a fluid connection between the conduit and the air induction system.

3. The system of claim 1, wherein the system does not include a purge ejector tee.

4. The system of claim 1, wherein the system does not include a second conduit fluidly coupled between the air induction system and the engine intake manifold.

5. The system of claim 1, wherein the inlet valve is an electronically controlled throttle valve.

6. The system of claim 1, further comprising a biasing mechanism configured to bias the inlet valve to the open position.

7. The system of claim 1, wherein the inlet valve is an electronically controlled solenoid valve.

8. A vehicle comprising:
   an internal combustion engine having an intake manifold;
   a throttle body valve fluidly coupled to the intake manifold and configured to selectively restrict the amount of air introduced to the internal combustion engine;
   an air induction system fluidly coupled to the intake manifold; and
   an evaporative emissions control system comprising:
      a carbon canister configured to receive fuel vapor;
      a purge valve fluidly coupled to the carbon canister;
      a conduit fluidly coupled between the purge valve and the air induction system; and
      an inlet valve disposed in the air induction system, the inlet valve configured to selectively move between an open position and a closed position to vary an air restriction in the air induction system and generate a vacuum, wherein the vacuum draws fuel vapor from the carbon canister through the conduit into the air induction system;
      wherein the evaporative emissions control system does not include a second conduit which is capable of fluidly coupling the purge valve to the intake manifold.

9. The vehicle of claim 8, wherein the inlet valve is disposed upstream of a fluid connection between the conduit and the air induction system.

10. The vehicle of claim 8, wherein the system does not include a purge ejector tee.

11. The vehicle of claim 8, wherein the system does not include a second conduit fluidly coupled between the air induction system and the engine intake manifold to supply air from the intake manifold to the air induction system.

12. The vehicle of claim 8, wherein the inlet valve is an electronically controlled throttle valve.

13. The vehicle of claim 8, further comprising a biasing mechanism configured to bias the inlet valve to the open position.

14. The vehicle of claim 8, wherein the inlet valve is an electronically controlled solenoid valve.

15. The vehicle of claim 8, further comprising a turbocharger disposed between the air induction system and the intake manifold, wherein the air induction system includes a dirty side duct, an air cleaner, and a clean side duct, the inlet valve disposed upstream of the clean side duct and downstream of the dirty side duct and the air cleaner.

16. The system of claim 1, wherein the air induction system includes an air cleaner, and the inlet valve is disposed downstream of the air cleaner.

* * * * *